(12) United States Patent
Prater

(10) Patent No.: US 6,560,856 B1
(45) Date of Patent: May 13, 2003

(54) SELF-ALIGNING FIXTURE FOR PRE-LOADING AND ALIGNING PIVOT BEARING ASSEMBLIES

(75) Inventor: Walter L. Prater, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 144 days.

(21) Appl. No.: 09/603,624

(22) Filed: Jun. 26, 2000

(51) Int. Cl.⁷ ............................................. B23P 19/04
(52) U.S. Cl. .................... 29/724; 29/898.07; 29/898.09
(58) Field of Search ......................... 29/898.09, 898.07, 29/446, 724, 725

(56) References Cited

U.S. PATENT DOCUMENTS

| | | | |
|---|---|---|---|
| RE14,311 E | * 6/1917 | Martell | 301/99 |
| 3,785,023 A | * 1/1974 | Harbottle | 29/898.09 |
| 3,830,633 A | * 8/1974 | Harbottle | 29/898.09 |
| 3,900,232 A | * 8/1975 | Rode | 384/517 |
| 4,336,641 A | * 6/1982 | Bahtia | 29/898.09 |
| 4,476,614 A | * 10/1984 | Pittroff | 29/898.09 |
| 4,792,245 A | 12/1988 | Fuke et al. | |
| 5,065,512 A | 11/1991 | Stachlecker | |
| 5,115,558 A | * 5/1992 | Bernhardt et al. | 29/705 |
| 5,125,156 A | * 6/1992 | Witte | 29/898.09 |
| 5,144,743 A | * 9/1992 | Kempas | 29/898.09 |
| 5,159,754 A | * 11/1992 | Vancsik | 29/898.07 |
| 5,486,054 A | 1/1996 | Nagata et al. | |
| 5,510,940 A | 4/1996 | Tacklind et al. | |
| 5,524,343 A | * 6/1996 | Blanks | 29/898.09 |
| 5,535,517 A | * 7/1996 | Rode | 29/898.09 |
| 5,564,840 A | * 10/1996 | Jurras, III et al. | 384/517 |
| 5,579,570 A | * 12/1996 | Bonvallet | 29/724 |
| 5,628,571 A | * 5/1997 | Ohta et al. | 384/518 |
| 5,666,242 A | * 9/1997 | Edwards et al. | 360/265.6 |
| 5,678,310 A | * 10/1997 | Chiba | 29/898.061 |
| 5,743,016 A | * 4/1998 | Manne et al. | 29/898.062 |
| 5,755,518 A | 5/1998 | Boutaghou | |
| 5,777,413 A | 7/1998 | Nagata et al. | |
| 5,835,309 A | 11/1998 | Boutaghou | |
| 5,914,837 A | * 6/1999 | Edwards et al. | 360/265.6 |
| 5,938,348 A | 8/1999 | Boutaghou | |
| 6,000,134 A | * 12/1999 | Jerraid | 29/898.09 |
| 6,003,229 A | * 12/1999 | Beduhn et al. | 29/898.09 |
| 6,070,325 A | * 6/2000 | Miyata et al. | 29/898.09 |
| 6,078,475 A | * 6/2000 | Lawson | 360/265.2 |
| 6,088,910 A | * 7/2000 | Jerraid | 29/724 |
| 6,202,306 B1 | * 3/2001 | Miyazaki | 29/898.09 |
| 6,327,773 B1 | * 12/2001 | Rode | 29/724 |
| 6,446,339 B2 | * 9/2002 | Takamizawa et al. | 29/898.09 |

* cited by examiner

Primary Examiner—S. Thomas Hughes
Assistant Examiner—Essama Omgra
(74) Attorney, Agent, or Firm—Robert B. Martin; Bracewell & Patterson, L.L.P.

(57) ABSTRACT

A fixture for pre-loading a pivot assembly has a stationary base and a tool that is axially movable relative to the base. The tool has a platen with a pre-load mass and a cylindrical enclosure. A sphere is suspended within the enclosure but is free to roll and move laterally along three degrees of freedom. The pivot assembly has an external sleeve with a coaxial shaft mounted on bearings. Each ball bearing has an inner ring, an outer ring, and balls in between. The rings are adhesively bonded to the shaft and sleeve. The pivot is placed on the base of the fixture and the tool is lowered. The sphere is free to "float" within the enclosure until it makes contact with the inner ring of the upper bearing in the pivot. Upon contact, the compliant, rolling sphere automatically self-aligns with the pivot. The pre-load mass applies the desired force against the pivot until the adhesive cures. The sphere ensures that the pre-load force is uniform around the ball compliment circumference of the bearings such that the inner and outer rings of the bearings float and their raceways self-align under the pre-load force. After the adhesive cures, the pivots have negligible torque ripple and consistent dynamic response.

14 Claims, 5 Drawing Sheets

SELF-ALIGNING FIXTURE FOR PRE-LOADING AND ALIGNING PIVOT BEARING ASSEMBLIES

BACKGROUND OF THE INVENTION

1. Technical Field

The present invention relates in general to an assembly fixture, and in particular to an improved fixture for assembling pivot bearing assemblies for disk drives. Still more particularly, the present invention relates to a self-aligning fixture for pre-loading and aligning pivot bearing assemblies for disk drives.

2. Description of the Prior Art

Referring to FIG. 1, a schematic drawing of an information storage system comprising a magnetic hard disk file or drive 11 for a computer system is shown. Drive 11 has a base 13 containing magnetic disks 15 that are rotated about a hub 17. A set of actuator arms 21 are pivotally mounted to base 13 on a pivot assembly 23. A controller 19 is mounted to base 13 for selectively moving arms 21 relative to disks 15. Each arm 21 comprises a mounting support 25, a suspension 27, and a head gimbal assembly 29 having a magnetic read/write head secured to each suspension 27 for reading data from and writing data to disks 15. A conventional voice coil motor 26 is also mounted to pivot assembly 23 opposite head gimbal assemblies 29. Movement of an actuator driver 28 (indicated by arrow 30) moves head gimbal assemblies 29 across the disks 15 until the heads settle on the target tracks.

As shown in FIG. 2, pivot assembly 23 contains ball bearings 31, a shaft 33, and a sleeve 35. The naturally-occurring, micron scale, machine tolerance inaccuracies in these components and in the tolerances of a conventional fixture 37 used to pre-load pivot 23 (shown greatly exaggerated for clarity) accumulate during the assembly of pivot 23. The lower end of shaft 33 mounts in a hole 41 in base 43 of fixture 37. Sleeve 35 is suspended above the upper surface of base 43 as a tubular anvil or rod 45 exerts axial force on the upper face 46 of the inner ring 47 to pre-load pivot 23. Bearing pre-load is controlled to maintain sufficient stiffness of the pivot assembly. Fixture 37 only has one degree of freedom (up and down) to apply the pre-load to face 46 of inner ring 47.

The tolerance stack-up of pivot 23 and fixture 37 causes significant angular misalignment between inner and outer rings 47, 49. This misalignment or "ring face out-of-parallelism" creates a moment on one side of inner ring 47, thereby producing a greater localized pre-load force on the ball compliment. The term "ball compliment" is used to describe the array of spaced-apart balls within a bearing. Unfortunately, because fixture 37 is non-compliant, it is unable to compensate for ring face out-of-parallelism, raceway wobble and groove wobble. When a non-uniform, pre-load force is exerted on the ball compliment, one side is pinched tight by the raceways while the opposite side is loose. As pivot 23 rotates, the balls are compressed as they pass through the tight zone, thereby causing torque ripple. This phenomena is an excellent indicator that the actuator itself is dynamically unstable. Torque ripple must be compensated by the servo controller by varying the coil current. This non-uniform, pre-load force around the circumference of the bearing corresponds to a non-uniform stiffness around the circumference. Stiffness variation from pivot to pivot or circumferentially within one pivot can affect the frequencies and gains of the structural resonances of the actuator.

The problem of angular misalignment of the raceways can be prevented by increasing the radial clearance or gap between the shaft and the inner diameter of the bearing. A larger gap allows more compliance between the parts. Unfortunately, this solution creates the problem of increased outgassing arising from the additional adhesive required to fill the larger gap between the bearing and the shaft. Thus, an improved solution for pre-loading pivot assemblies is needed.

SUMMARY OF THE INVENTION

A fixture for pre-loading a pivot assembly has a stationary base and a tool that is axially movable relative to the base. The tool has a platen with a pre-load mass and a cylindrical enclosure. A sphere is suspended within the enclosure but is free to roll and move laterally along three degrees of freedom. The pivot assembly has an external sleeve with a coaxial shaft mounted on bearings. Each ball bearing has an inner ring, an outer ring, and balls in between. The rings are adhesively bonded to the shaft and sleeve.

The pivot is placed on the base of the fixture and the tool is lowered. The sphere is free to "float" within the enclosure until it makes contact with the inner ring of the upper bearing in the pivot. Upon contact, the compliant, rolling sphere automatically self-aligns with the pivot. The pre-load mass applies the desired force against the pivot until the adhesive cures. The sphere ensures that the pre-load force is uniform around the ball compliment circumference of the bearings such that the inner and outer rings of the bearings float and their raceways self-align under the pre-load force. After the adhesive cures, the pivots have negligible torque ripple and consistent dynamic response.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PREFERRED EMBODIMENT

Figure 1:
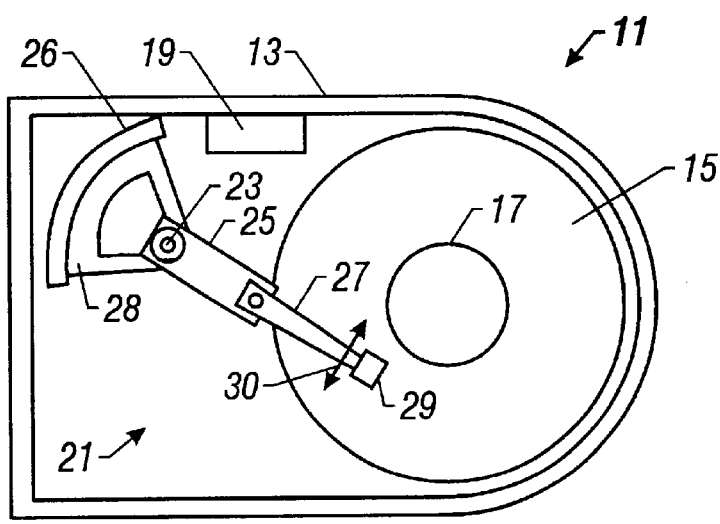
FIG. 1 is a schematic plan view of a prior art disk drive.
Figure 2:
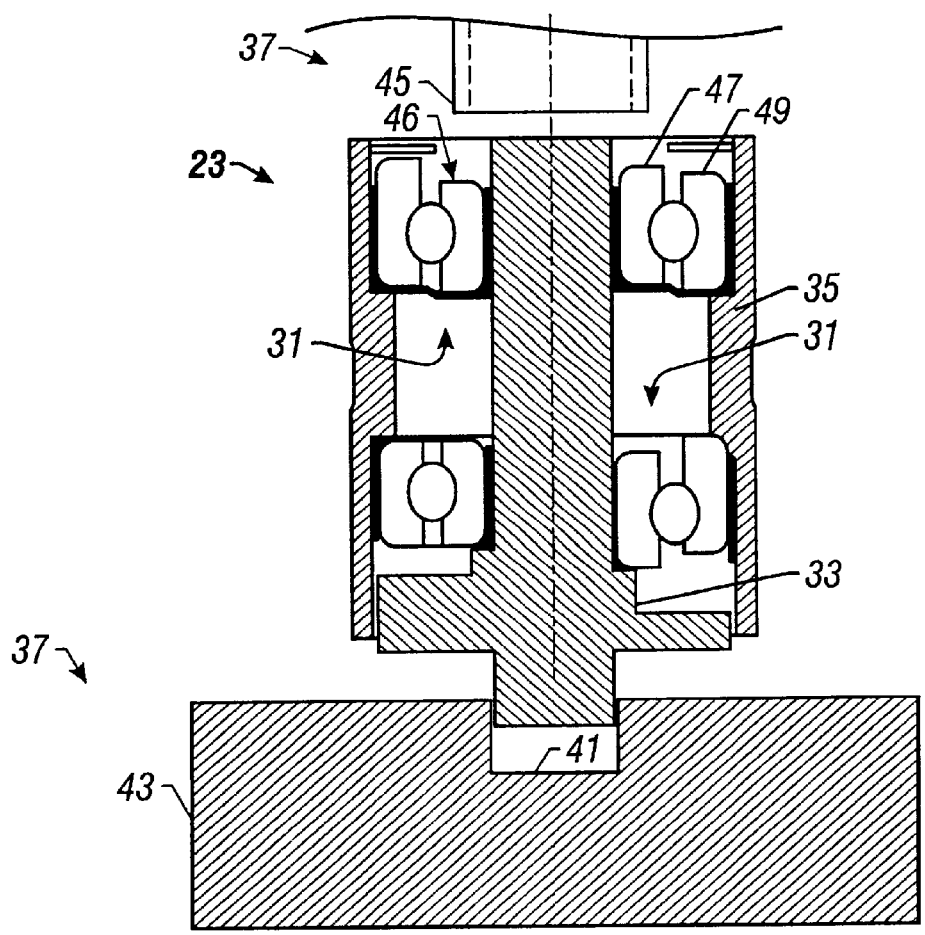
FIG. 2 is a sectional side view of a prior art fixture for assembling pivot assemblies.
Figure 3:
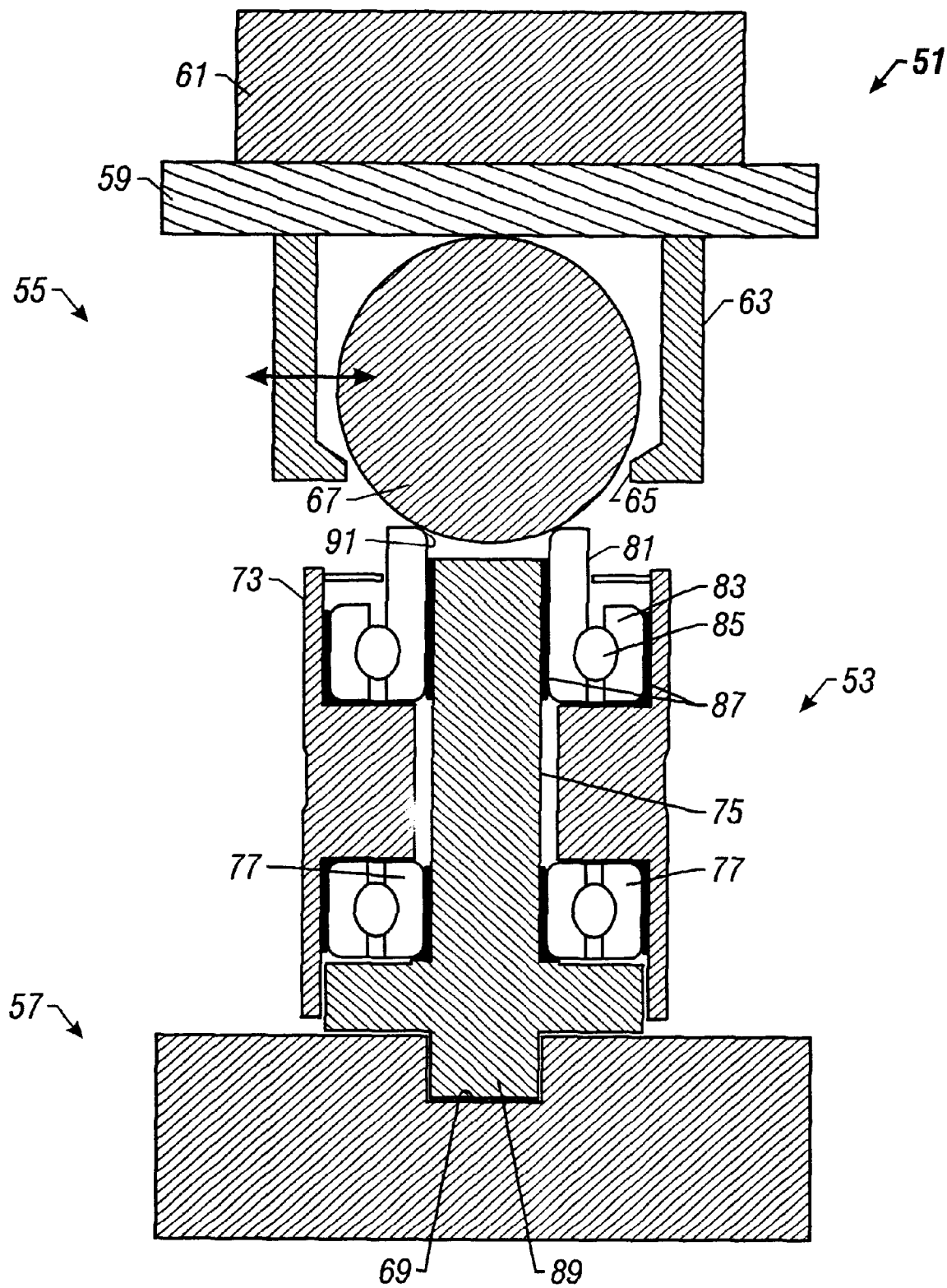
FIG. 3 is a sectional side view of a first embodiment of a pivot assembly fixture constructed in accordance with the invention.

Referring to FIG. 3, a fixture 51 for pre-loading a pivot assembly or "pivot" 53 is shown. Fixture 51 comprises an upper portion or tool 55 and a lower portion or base 57. Tool 55 has a hard, polished platen 59 with a selected pre-load mass 61 secured to an top side thereof. A generally cylindrical enclosure 63 extends from a lower side of platen 59 and has a concentric circular support aperture 65 on a lower end. A hard, polished contact sphere 67 is located within enclosure 63. The diameter of sphere 67 is less than an internal dimension of enclosure 63 such that sphere 67 has one degree of lateral play or translational freedom, and is free to roll laterally along two axes for a total of three degrees of freedom within enclosure 63. Both sphere 67 and platen 59 can be made of tool steel or high modulus ceramics. Base 57 is located below tool 55 and has a central blind hole or recess 69 located in the center thereof.

Pivot 53 is shown mounted in fixture 51. Pivot 53 has an external, cylindrical sleeve 73 with a coaxial shaft 75 mounted on a pair of bearings 77. Each bearing has an inner ring 81, an outer ring 83, and balls 85 therebetween. Inner and outer rings 81, 83 are bonded with an adhesive 87 to shaft 75 and sleeve 73, respectively. The lower end of pivot 53 rests on top of base 57 with a hub portion 89 located in hole 69. The inner ring 81 of upper bearing 77 is elongated to protrude axially beyond the upper end of sleeve 73 and shaft 75, and has a radiused bore 91 for contacting and engaging sphere 67 as shown. Bore 91 has a much smaller diameter than sphere 67 and, thus, provides a stable, annular seat therefor.

In operation, one of tool 55 and base 57 is stationary and the other is vertically or axially movable relative to the other. Sphere 67 is free to "float" within enclosure 63 until it makes contact with bore 91 of inner ring 81. Upon contact, the compliant, rolling sphere 67 is lifted off of support aperture 65 until it contacts the lower surface of platen 59. Sphere 67 automatically self-aligns with pivot 53 due to lateral play within enclosure 63. The pre-load mass 61 applies the desired force against pivot 53 for a selected time interval until adhesive 87 sufficiently cures. Sphere 67 ensures that the pre-load force is uniform around the ball train circumference of bearings 77. In turn, the inner and outer rings 81, 83 of bearings 77 float so that their raceways will self-align with respect to the ball compliment under the pre-load force. Pivots 53 produced by this apparatus and method have negligible torque ripple and consistent dynamic response.

Figure 4:
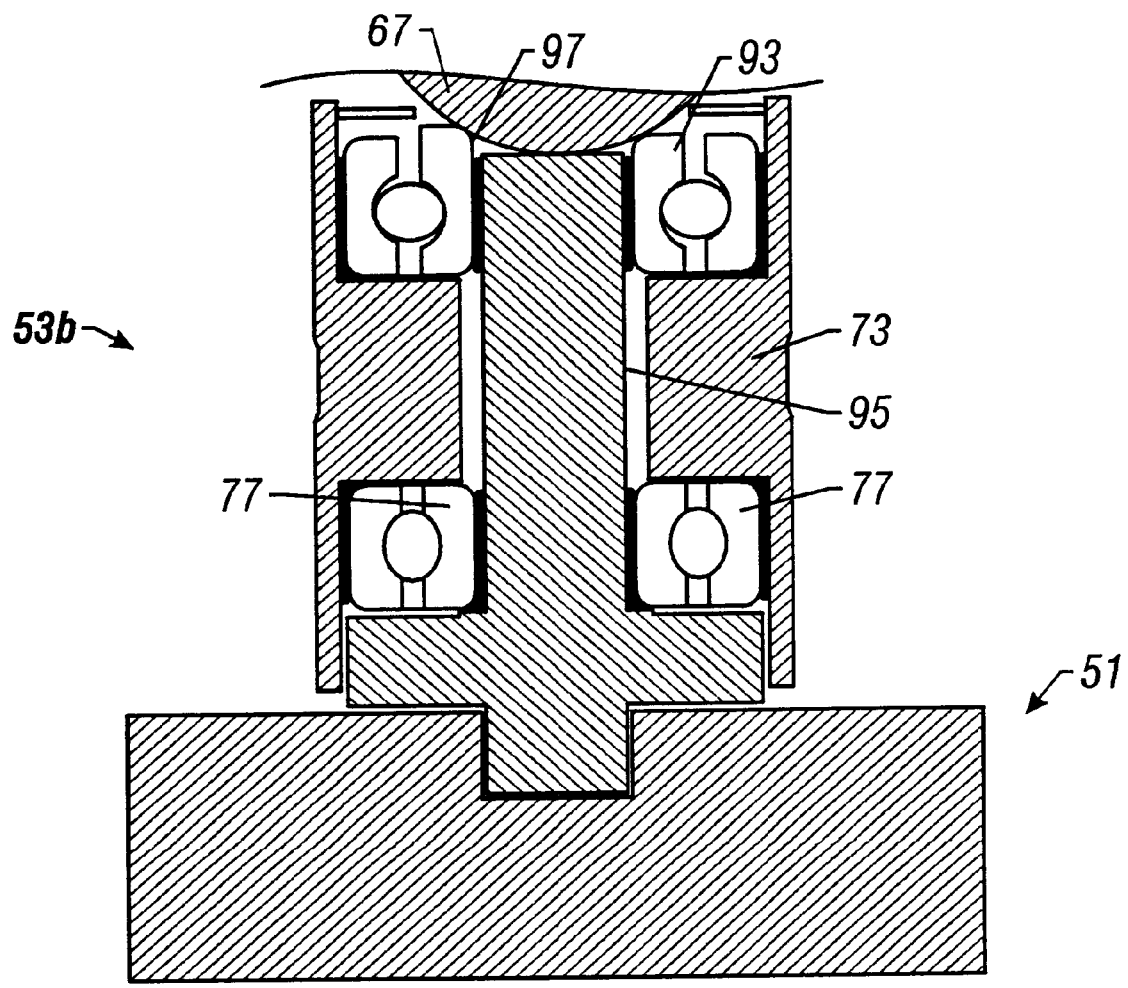
FIG. 4 is a sectional side view of an alternate version of the pivot assembly fixture of FIG. 3.

In another version of the first embodiment of the invention, pivot 53b may be provided with an axially shorter inner ring 93 (FIG. 4) and recessed shaft 95. Inner ring 93 has an axial dimension that protrudes only beyond the axial end of shaft 95, but not beyond the axial end of sleeve 73. As in the previous version of FIG. 3, inner ring 93 is provided with a radiused, annular seat 97 for providing stable engagement with sphere 67 and operates in the same manner as described above.

Figure 5:
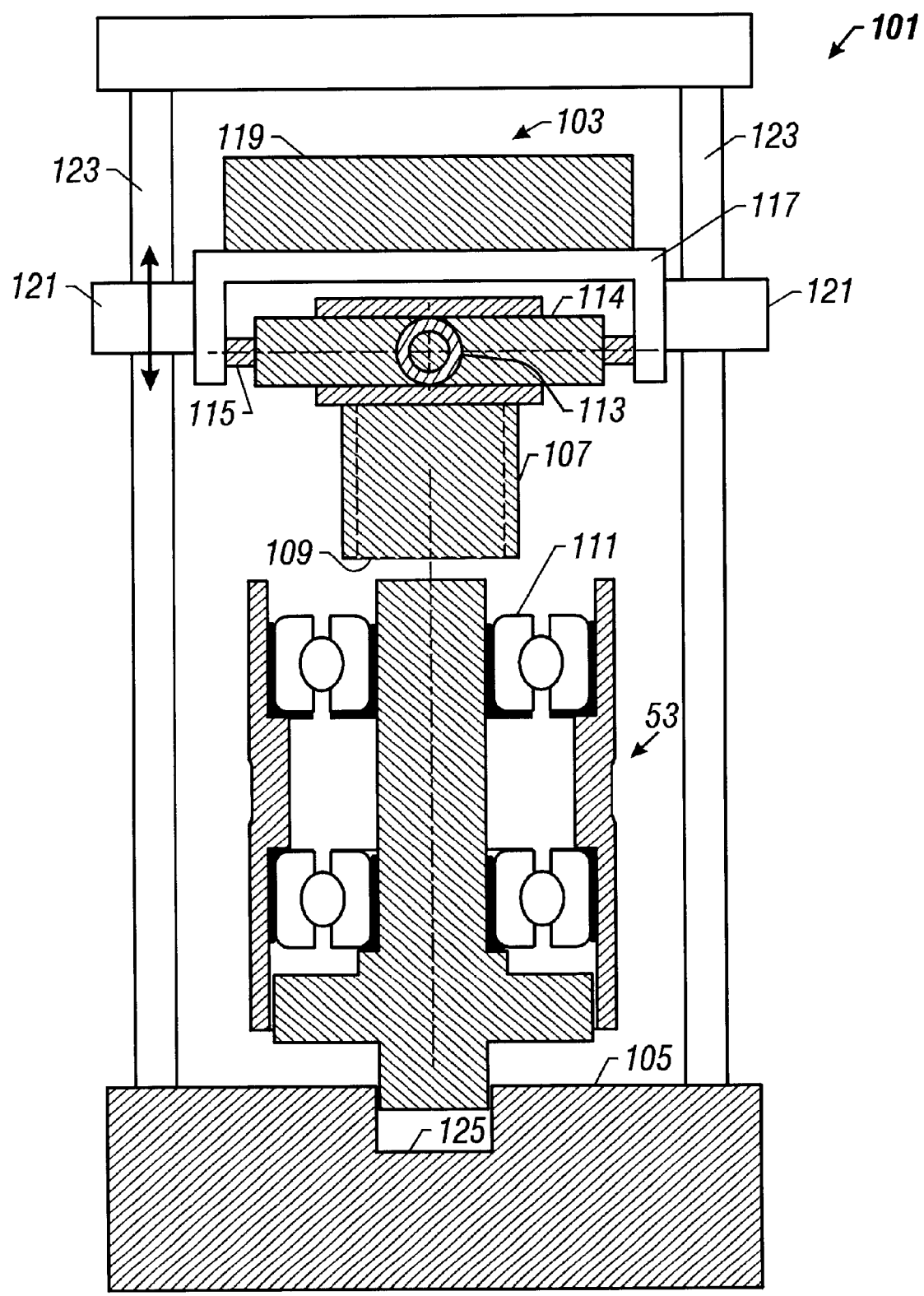
FIG. 5 is a sectional side view of a second embodiment of a pivot assembly fixture constructed in accordance with the invention.
Figure 6:
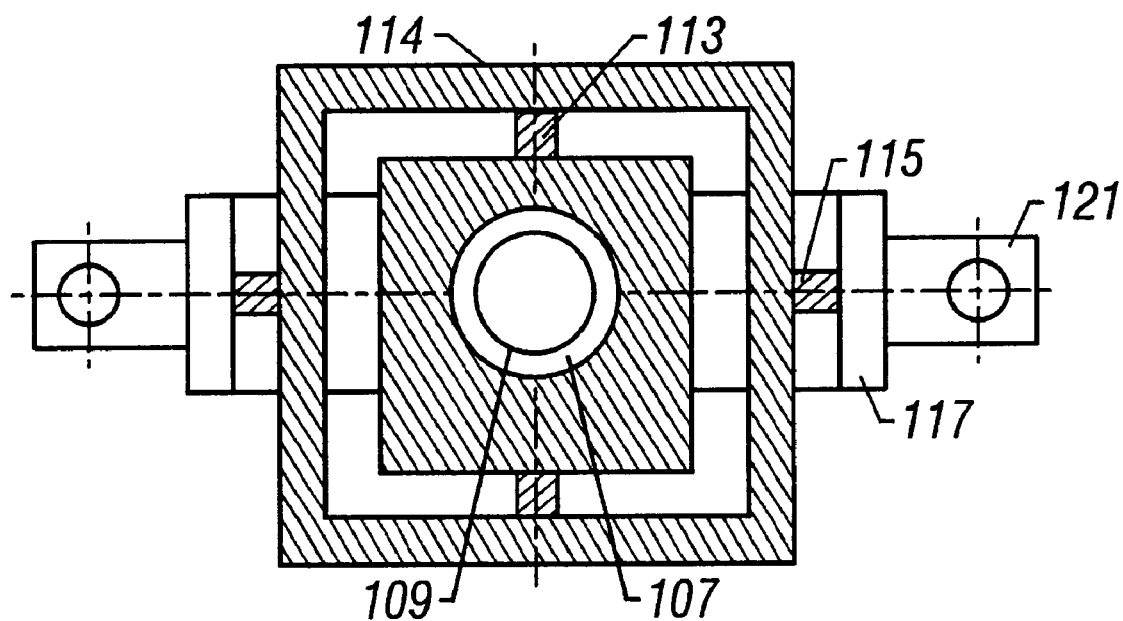
FIG. 6 is a bottom plan view of the pivot assembly fixture of FIG. 5.

A second embodiment of the invention is depicted in FIGS. 5 and 6 as a fixture 101 for pre-loading pivot 53. Like fixture 51, fixture 101 comprises a movable tool 103 and a stationary base 105. Tool 103 has a tubular anvil 107 with a hard, polished, lower annular surface 109 for engaging a conventional inner ring 111 in pivot 53. Anvil 107 may be formed from tool steel or high modulus ceramics. The upper end of anvil 107 is directly mounted to a first gimbal 113 having one degree of rotational freedom. The axle of gimbal 113 is pivotally mounted to a frame 114. Frame 114 is mounted to a second gimbal 115 having a second degree of rotational freedom. The axle of gimbal 115 is pivotally mounted to a housing 117 having a pre-load mass 119 mounted thereto, and a slide bushing 121 on opposite ends. Each bushing 121 is slidably mounted to an upright frame member 123 for vertical motion relative thereto. Base 105 is located below tool 103 and has a central blind hole 125 located in the center thereof.

In operation, fixture 101 is very similar to fixture 51. Pivot 53 is placed on base 105 such that the lower end of its shaft protrudes into hole 125. Tool 103 is then lowered vertically or axially toward pivot 53. Anvil 107 is free to gimbal or "float" relative to housing 117 until it makes contact with the face of the inner ring 111. Upon contact, the compliant anvil 107 automatically self-aligns with pivot 53 and pre-load mass 119 applies the desired force against pivot 53 for a selected time interval until the adhesive therein sufficiently cures. Gimbals 113, 115 ensure that the pre-load force is uniform around the ball compliment circumference of the bearings in pivot 53. The inner and outer rings of the bearings float so that their raceways will self-align with respect to the ball compliment under the pre-load force to substantially eliminate torque ripple and give pivot 53 consistent dynamic response. As in the previous embodiment, fixture 101 can readily accommodate pivots having alternate geometries.

The invention has several advantages including the ability to compensate for misalignments such as ring face out-of-parallelism, raceway wobble and groove wobble. The gimbaling and spherical designs have two additional rotational degrees of freedom over prior art fixtures. These features prevent permanent angular misalignment of the inner and outer rings of the bearings which can cause torque variations when the pivot is rotated. By allowing the inner and outer rings to "float," the bearing raceways will self-align with respect to the ball compliment under the pre-load force as the adhesive cures. The compliance of the gimbals ensures that the pre-load force is uniformly transferred around the ball compliment circumference. As the uniformly pre-loaded ball compliment rotates, there is no torque variation and the torque plot is smooth, thus achieving the design objective of uniform stiffness. Therefore, the pivot has negligible torque ripple and consistent dynamic response.

While the invention has been shown or described in only some of its forms, it should be apparent to those skilled in the art that it is not so limited, but is susceptible to various changes without departing from the scope of the invention. For example, the tool may be stationary and provided without a pre-load mass such that the base is moved toward the tool with a desired force for pre-loading the pivot.

What is claimed is:

1. A fixture for pre-loading a pivot assembly having a sleeve, a shaft, and a bearing therebetween, comprising:
    a base adapted to support the pivot assembly;
    tool means for applying a pre-load to the pivot assembly, wherein the tool means has at least two degrees of rotational freedom relative to the pivot assembly and is adapted to engage the bearing of the pivot assembly when one of the tool means and the base is moved toward the other; and wherein
    the tool means comprises a platen, an enclosure extending from the platen, and a sphere captured within the enclosure adjacent to the platen.

2. The fixture of claim 1 wherein the tool means has one degree of translational freedom.

3. The fixture of claim 1, further comprising a pre-load mass mounted to the tool means, wherein the tool means is located above the base and moved vertically relative thereto.

4. The fixture of claim 1 wherein the tool means comprises a dual gimbal assembly.

5. The fixture of claim 1 wherein the tool means is adapted to ensure that a pre-load force is uniform around a ball compliment circumference of the bearing such that an inner ring and an outer ring of the bearing float and that a raceway of each of the rings self-aligns under the preload force.

6. A fixture for pre-loading a pivot assembly having a sleeve, a shaft, and at least one ball bearing adhesively bonded therebetween, wherein the ball bearing has an inner ring, an outer ring, and balls therebetween, comprising:

a base adapted to support the pivot assembly;

a tool located above the base and movable relative thereto, the tool having a platen, an enclosure extending from the platen, and a sphere captured within the enclosure adjacent to the platen, wherein the sphere has two degrees of rotational freedom and is adapted to engage and apply a uniform, compliant, pre-load force to the inner ring of the bearing of the pivot assembly while the adhesive therein cures, and wherein the pre-load force is transferred around a ball compliment circumference of the bearing such that the inner and outer rings of the bearing float and that raceways of the rings self-align under the pre-load force.

7. The fixture of claim 6 wherein a diameter of the sphere is less than an internal dimension of the enclosure such that the sphere has one degree of translational freedom therein.

8. The fixture of claim 6, further comprising a pre-load mass mounted to the tool for applying the pre-load force to the pivot assembly.

9. The fixture of claim 6 wherein the enclosure is cylindrical and extends from a lower side of the platen and has a concentric circular support aperture on a lower end, and wherein a diameter of the sphere is greater than a diameter of the aperture.

10. The fixture of claim 6 wherein the sphere is free to float within the enclosure prior to applying the pre-load force, and wherein the sphere contacts the platen upon application of the pre-load force.

11. A fixture for pre-loading a pivot assembly having a sleeve, a shaft, and at least one ball bearing adhesively bonded therebetween, wherein the ball bearing has an inner ring, an outer ring, and balls therebetween, comprising:

a base adapted to support the pivot assembly;

a tool located above the base and movable relative thereto, the tool having an anvil mounted on a dual gimbal assembly, wherein the anvil has two degrees of rotational freedom and is adapted to engage and apply a uniform, compliant, pre-load force to the inner ring of the bearing of the pivot assembly while the adhesive therein cures, and wherein the pre-load force is transferred around a ball compliment circumference of the bearing such that the inner and outer rings of the bearing float and that raceways of the rings self-align under the pre-load force; and wherein the anvil is tubular with a hard, polished, lower annular surface for engaging the inner ring.

12. The fixture of claim 11, further comprising a pre-load mass mounted to the tool for applying the pre-load force to the pivot assembly.

13. The fixture of claim 11 wherein the dual gimbal assembly comprises a first gimbal having one degree of rotational freedom and a first axle pivotally mounted to a frame, wherein the frame is mounted to a second gimbal having a second degree of rotational freedom and a second axle pivotally mounted to a housing, and wherein the anvil is mounted to the first gimbal.

14. A fixture for pre-loading a pivot assembly having a sleeve, a shaft, and at least one ball bearing adhesively bonded therebetween, wherein the ball bearing has an inner ring, an outer ring, and balls therebetween, comprising:

a base adapted to support the pivot assembly;

a tool located above the base and movable relative thereto, the tool having an anvil mounted on a dual gimbal assembly, wherein the anvil has two degrees of rotational freedom and is adapted to engage and apply a uniform, compliant, pre-load force to the inner ring of the bearing of the pivot assembly while the adhesive therein cures, and wherein the pre-load force is transferred around a ball compliment circumference of the bearing such that the inner and outer rings of the bearing float and that raceways of the rings self-align under the pre-load force; and wherein the tool has a pair of bushings slidably mounted to a frame member for vertical motion relative thereto.

* * * * *

UNITED STATES PATENT AND TRADEMARK OFFICE
CERTIFICATE OF CORRECTION

PATENT NO.     : 6,560,856 B1
DATED          : May 13, 2003
INVENTOR(S)    : Walter L. Prater It is certified that error appears in the above-identified patent and that said Letters Patent is hereby corrected as shown below:

<u>Column 1,</u>
Line 28, please insert the word -- radially -- after the number "29" and before the word "across".

Signed and Sealed this

Second Day of September, 2003

JAMES E. ROGAN
*Director of the United States Patent and Trademark Office*